June 29, 1937. A. P. ANDERSON ET AL 2,085,521
CONTINUOUS DEWAXING PROCESS AND APPARATUS
Filed July 23, 1934
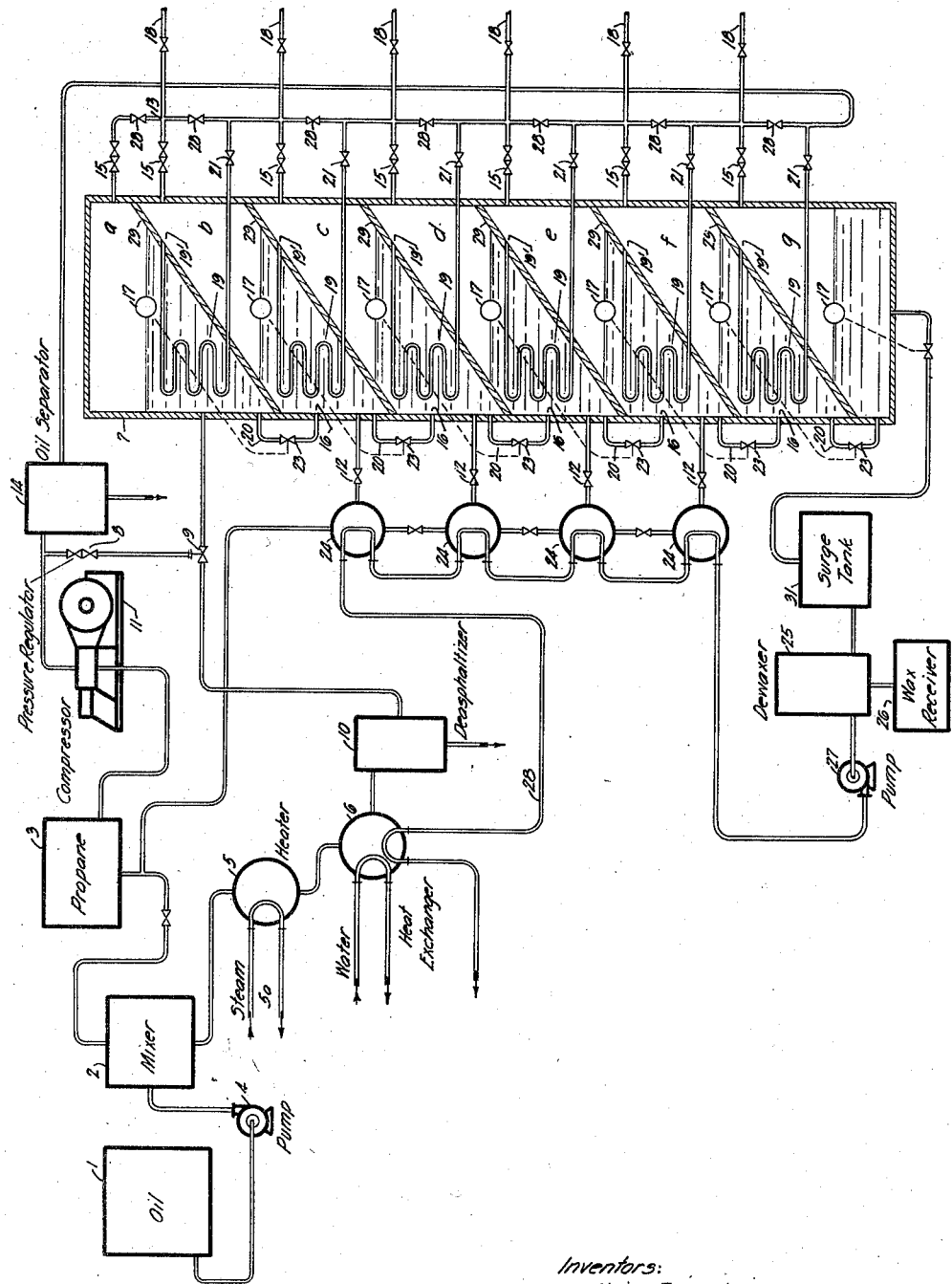
Inventors:
Alvin P. Anderson
Chever M. Kellogg
By their Attorney Patented June 29, 1937

2,085,521

UNITED STATES PATENT OFFICE 2,085,521

CONTINUOUS DEWAXING PROCESS AND APPARATUS

Alvin Pierce Anderson, Wood River, Ill., and Chever M. Kellogg, University City, Mo., assignors to Shell Development Company, San Francisco, Calif., a corporation of Delaware Application July 23, 1934, Serial No. 736,510

11 Claims. (Cl. 62—114)

This invention pertains to the separation of wax from mineral oils and is more particularly concerned with a method and apparatus in which chilling and crystallization of wax are effected and controlled in a continuous manner.

For a considerable number of years, various methods of dewaxing petroleum products in the presence of such solvents as light naphthas, acetonebenzol, etc., have been in use. These solvents were used to dilute the wax-bearing oils, the solution being subsequently chilled and the wax separated from the diluted oil by filtering, settling, centrifuging, or similar methods.

Recently, advantages have been claimed in this regard for the use of liquefied normally gaseous hydrocarbons, such as propane, butane and the like. An especially advantageous feature of these oil solvents lies in the fact that they can easily be evaporated from the wax-bearing oil by reducing the pressure on the oil solution, thereby causing the lowering of its temperature, and producing a chilling effect, sometimes called self-refrigeration.

Propane dewaxing, as currently practised, is usually carried out in a batch or continuous chilling process in which a body of oil dissolved in propane is chilled by self-refrigeration and/or by indirect cooling, involving either a heat exchange with a pre-cooled solution, or an expansion of easily liquefiable gases, such as ammonia or carbon dioxide.

The main difficulty to be met in successfully carrying out a continuous dewaxing process with propane lies in establishing a satisfactory control over the rate of chilling of the oil-propane mixture. At the temperature at which wax starts to precipitate, chilling must be slow and uniform to prevent formation of wax nuclei from supersaturated solutions. If the rate of chilling is greater than about 2–10° F. per minute, an effect known as shock chilling occurs, and fine wax crystals are formed which are difficult to filter because they present less void space between separate particles and give greater surface which retains oil by absorption. Since the production of large crystal waxes or aggregates of smaller crystals is therefore most desirable from a commercial standpoint, it is a purpose of this invention to provide an improved apparatus in which such waxes may be obtained through an efficient control of the rate of chilling. According to this invention, such control is achieved by using a greater number of stages than would be possible with separately built evaporators, by maintaining a uniform temperature and pressure gradient throughout the system by admitting fresh pre-cooled propane in some or all of the intermediate stages, by recirculating gaseous propane from a given stage in indirect heat exchange with the oil-propane mixture of the preceding stage, and by introducing the liquid mixture into each stage under a sufficient hydrostatic head to retard the rate of pressure drop between the stages.

It is another purpose of this invention to provide a dewaxing apparatus of compact arrangement and considerably smaller initial cost than the conventional type consisting of a plurality of separate stage evaporators.

It is a further purpose of this invention to provide a dewaxing apparatus wherein the loss of refrigeration will be reduced as a result of a decreased area of contact between the chilled substances and the atmosphere, with a resultant reduction in the cost of insulation.

Finally, it is a purpose of this invention to provide a system of evaporators wherein the transfer of the liquid mixture from any stage to the next lower one may be effected by gravity alone, without recourse to auxiliary pumping means.

Briefly, the apparatus of this invention consists of a vertical column divided into compartments by inclined solid partitions of elliptical periphery, each of said compartments forming one of the evaporating stages.

This will be clearly understood from the following description taken with reference to the attached drawing diagrammatically representing all the apparatus necessary for carrying out a dewaxing process with propane.

Referring to the drawing, the wax-bearing oil is pumped by pump 4 from a reservoir 1 to a mixer 2, where it is thoroughly commingled with liquefied propane introduced from a tank 3. Suitable agitating means may be provided in mixer 2. Since propane is used in liquid form, it is held and conveyed to the mixer under a pressure of from about 80 to about 180 lbs./sq. in., which is sufficient to liquefy it at normal temperatures. About 150%–200% of solvent should be present at the filtering stage so that the initial quantity of solvent should be about 200% plus the amount evaporated in chilling. If all the chilling were accomplished by direct refrigeration, roughly 200% more solvent would be needed, bringing the total up to 400%. However, with the heat-exchanging system used according to this invention, a smaller initial quantity of solvent is sufficient, such as, for example, 250%.

As the first step in dewaxing, the wax bearing oil must be completely dissolved in the diluent. To accomplish this, the mixture is passed through a heater 5, wherein a suitable heating agent, such as steam, may be circulated in a coil 5a, thereby raising the temperature of the mixture to the average melting point of the wax and assuring a sufficiently rapid solution. This temperature depends to some extent on the amount of wax, the amount of solvent, the time factor, and the particular stock being dewaxed. With average Mid-Continent stock, a temperature of about 130° F. is satisfactory with 250–300% propane based on the stock charge.

From heater 5, the oil-propane mixture is passed through the heat-exchanger 6, where it is pre-cooled by indirect contact with the chilled dewaxed oil admitted through pipe 28, or any other cooling medium such as water. Due to the time-lag of wax precipitation and to the fact that the wax being precipitated includes a relatively wide range of melting points, pre-cooling in heat exchanger 6 may be carried down to about 80°–100° F. From heat exchanger 6 the mixture is conveyed to a deasphaltizer 10, where the asphalt contained in the oil may be separated out by any conventional method. If asphalt is not properly settled, it may gradually separate during the chilling process forming asphalt plugs in lines and coils, and will interfere with the operation of valves and other control devices. In case of a relatively large asphalt content, it may seriously interfere with the filtration of the wax.

From the deasphaltizer 10 the pre-cooled oil-propane mixture is introduced into the first of a series of evaporators, which, according to this invention, are constructed as a single unit, consisting of a single vertical cylindrical column 7, usually well insulated to reduce the exchange of heat with surroundings; the column is separated into sections (shown as a, b, c, d, etc.) by closed partitions 29, preferably inclined and having elliptic peripheries. These metal partitions or plates are welded to the shell of the tower and may be reinforced by suitable stays. It is understood that although only 7 sections are shown on the diagrammatic drawing, any number of these can be used depending on the rate of cooling desired; for example, when an average temperature drop of 3° F. per stage is desired and the solution must be cooled 60° F. from the temperature at the entrance into the uppermost section, then 20 sections must be used; these may be combined in a single unit or divided into two groups, each in one column, connected in series. The sections may be of different volumes so as to compensate for difference in gas velocities, to increase the time of contact at any particular temperature or to provide for the introduction of additional cold propane. The rate of admission of the liquid feed to the first stage evaporator 7a may be controlled through a valve 9 by a master pressure regulator 8 in accordance with the capacity of the compressor 11 operating in conjunction with the system. Each of the evaporators 7a, etc. is connected to a manifold 13 communicating through an oil separator 14 with the compressor 11. Instead of one oil separator 14, a plurality of such separators may be connected with the manifold 13, one for each evaporating stage. Each stage is equipped with a pressure regulator 15 discharging vapors to the compressor 11 as indicated. In this way an adequate pressure drop may be obtained in each stage in accordance with the temperature gradient desired in the system and the load to the compressor may be varied as desired. For example, a pressure of 130 lbs. may be used in the first evaporator with a subsequent drop of 5 lbs. in each of the following stages. This would cause in each stage an evaporation of propane resulting, if an adequate number of stages is used, in a gradient of chilling temperatures from about 80° F. to about —40° F. or below. It is obvious that instead of one compressor 11, several compressors may be used (connections for which are indicated as 18) and check valves 28 inserted between successive stages, so that in case the pressure rises in any stage above the normal operating pressure of that stage the vapor may pass to the compressor suction of the preceding stage.

The evaporators communicate with each other by means of pipes 20, the flow in these pipes being maintained by virtue of gravity and controlled by valves 23, actuated by the liquid level controllers 17, responsive to the liquid level in the various stages of the evaporator. This level is in turn adjusted with regard to the nozzles of pipes 16 through which the liquid enters the evaporators so as to establish in each evaporator a sufficient hydrostatic head on the entering liquid and to retard the rate of pressure drop between the stages, thus preventing too rapid a chilling and minimizing the danger of shock chilling.

Each of the evaporator stages may be equipped with a closed coil 19, in which gaseous propane from the next lower stage may be recirculated in heat exchange relationship with the liquid in the liquid in the compartment, as shown, for chilling the liquid and for improving the control of the rate of chilling. One end of each coil 19 is fitted in an opening 19' in a partition 29, and is in communication with the next lower compartment, whereby gas from the lower compartment will flow through the coil, in heat-exchange relationship to the liquid in the adjacent upper compartment, and through the valves 21, which may be employed to control the rate of flow of gas through the coil. It is thus possible to cut the re-circulating feature entirely out of the system if such re-circulation is not desirable for some reason. By providing suitable coils in each compartment (not shown on the drawing) it may also be possible to circulate ammonia or cold brine through the system for purposes of indirect refrigeration and further temperature control.

Pipes 12 may also be provided, through which propane, cooled in heat exchangers 24 by indirect contact with cold filtrate from the dewaxer to an adequate temperature, may be introduced into some or all of the intermediate stages. This cold propane will replace part of the propane evaporated and decrease the chilling load.

The chilled oil, after passing through the evaporators at a suitable rate calculated to give the desired crystalline structure of wax, may be withdrawn from the last evaporator 7g and conducted to a surge tank 31 where it may be allowed to stand for some time at a low temperature, since it has been found that this tends further to increase the size of the crystals and therefore to improve the quality of the final product. From the surge tank 29 the wax-bearing oil is led to a dewaxer 25, where the crystals may be separated by any conventional method, such as filtering, pressing, centrifuging, etc. The separated wax is then directed to a wax receiver 26, while pump 27 drives the dewaxed chilled oil to the heat exchangers 6 and 24 through pipe 28.

It is understood that both in this specification and in the claims attached, the word propane is used as a generic term, and that propane, butane, pentane, or any other suitable volatile material may be used. It is equally possible to use a combination of solvents, wherein one may act as an oil diluent and wax precipitant (e. g., pentane, hexane, gasoline, light naphthas, kerosene, or a selective solvent, such as $SO_2$ or furfural, acetone and the like, etc.) while others may be more volatile, normally gaseous hydrocarbons, such as propane and butane, added for purposes of self-refrigeration.

Since it is sometimes necessary to handle large volumes of oil-propane mixture, it is understood that, if desired, several columns of the type described above may be used in parallel.

We claim as our invention

1. An apparatus for continuously dewaxing hydrocarbon oils dissolved in a volatile diluent, comprising a vertical column provided with a plurality of partitions, arranged within said column to provide a vertical series of chambers, a liquid flow conduit from each chamber to the next lower one, provided with flow control means for maintaining a pool of liquid in each chamber and a vapor space in each chamber above the pool of liquid, a vapor discharge line from each section, and pressure controlling means in said vapor discharge lines arranged to maintain progressively decreasing pressure from the uppermost section to the lowest section.

2. An apparatus for continuously dewaxing hydrocarbon oils dissolved in a volatile diluent comprising a vertical column provided with a plurality of inclined partitions, arranged within said column to provide a vertical series of chambers, a liquid flow conduit from each chamber to the next lower one, provided with flow control means for maintaining a pool of liquid in each chamber and a vapor space in each chamber above the pool of liquid, a vapor discharge line from each section, and pressure controlling means in said vapor discharge lines arranged to maintain progressively decreasing pressure from the uppermost section to the lowest section.

3. An apparatus for continuously dewaxing hydrocarbon oils dissolved in a volatile diluent comprising a vertical column provided with a plurality of partitions, arranged within said column to provide a vertical series of chambers, a liquid flow conduit from each chamber to the next lower one, provided with flow control means for maintaining a pool of liquid in each chamber and a vapor space in each chamber above the pool of liquid, a coil in at least one of said sections other than the lowest located to be immersed in the pool of liquid, the intake of said coil being in communication with the vapor space of the next lower section, a vapor discharge line for each coil, a vapor discharge line from each section not in communication with a vapor discharge through a coil, and pressure controlling means in said vapor discharge lines arranged to maintain progressively decreasing pressure from the uppermost section to the lowest section.

4. An apparatus for continuously dewaxing hydrocarbon oils dissolved in a volatile diluent comprising a vertical column provided with a plurality of partitions, arranged within said column to provide a vertical series of chambers, a liquid flow conduit from each chamber to the next lower one, provided with flow control means for maintaining a pool of liquid in each chamber and a vapor space in each chamber above the pool of liquid, a coil in each of said sections other than the lowest located to be immersed in the pool of liquid, the intake of said coil being in communication with the vapor space of the next lower section, a vapor discharge line for each coil, a vapor discharge line from the uppermost section, and pressure controlling means in said vapor discharge lines arranged to maintain progressively decreasing pressure from the uppermost section to the lowest section.

5. An apparatus for continuously chilling a solution of a substantially non-volatile liquid in a volatile diluent comprising a sequence of closed chambers, each chamber being shaped to maintain a substantially uniform vapor pressure within said chamber, liquid inlet means for the first chamber, liquid discharge means in each of said chambers, each outlet means being provided with flow control means for maintaining a pool of liquid in each chamber at a predetermined level below the top of the chamber and arranged to withdraw only liquid from the chambers, all discharge means except that from the last chamber being in communication with next chamber in the sequence by means of relatively short conduits, whereby substantially no vapor is separated from a solution containing a volatile refrigerant dissolved in a non-volatile liquid when flowed from one chamber to another through said conduits, a vapor discharge line for each chamber arranged to withdraw vapor from the chambers and pressure controlling means in said vapor discharge lines arranged to maintain progressively decreasing pressure from the first to the last chamber in the sequence.

6. An apparatus for continuously chilling a solution of a substantially non-volatile liquid in a volatile diluent comprising a sequence of closed chambers, liquid inlet means for the first chamber, liquid discharge means in each of said chambers, each outlet means being provided with flow control means for maintaining a pool of liquid in each chamber at a predetermined level below the top of the chamber and arranged to withdraw only liquid from the chambers, all discharge means except that from the last chamber being in communication with next chamber in the sequence, a heat exchange conduit in at least one of said sections other than the last section located for heat exchange with the said pool of liquid connected to withdraw vapor from the next succeeding chamber in the sequence, a discharge line for each heat exchange conduit, a vapor discharge line for each chamber not in communication with a vapor discharge line through a heat exchange conduit arranged to withdraw vapor from the chambers and pressure controlling means in said vapor discharge lines arranged to maintain progressively decreasing pressure from the first to the last chamber in the sequence.

7. An apparatus for continuously chilling a solution of a substantially non-volatile liquid in a volatile diluent comprising a sequence of closed chambers, liquid inlet means for the first chamber, liquid discharge means in each of said chambers, each outlet means being provided with flow control means for maintaining a pool of liquid in each chamber at a predetermined level below the top of the chamber and arranged to withdraw only liquid from the chambers, all discharge means except that from the last chamber being in communication with next chamber in the sequence, a heat exchange conduit in each of said sections other than the last section located for heat exchange with the said pool of liquid connected to withdraw vapor from the next succeeding chamber in the sequence, a discharge line for each heat exchange conduit, a vapor discharge line for the first chamber arranged to withdraw vapor from the chambers and pressure controlling means in said vapor discharge lines arranged to maintain progressively decreasing pressure from the first to the last chamber in the sequence.

8. A process for continuously chilling a substantially non-volatile liquid, the steps comprising flowing a mixture of said liquid and a liquid volatile refrigerant under pressure through a sequence of evaporation stages maintained at successively lower pressures to fractionally vaporize successive portions of said refrigerant while substantially preventing vaporization of said refrigerant from said mixture flowing between said stages, each of said stages being operated at a uniform vapor pressure, and controlling the degree of evaporation at each stage by withdrawing the vaporized refrigerant at each stage at a predetermined pressure which is lower than the pressure in the preceding stage, and withdrawing the chilled liquid from the last stage.

9. A process for continuously chilling a substantially non-volatile liquid, the steps comprising flowing a mixture of said liquid and a liquid volatile refrigerant under pressure through a sequence of evaporation stages maintained at successively lower pressures to fractionally vaporize successive portions of said refrigerant, and controlling the degree of evaporation at each stage by withdrawing the vaporized refrigerant at each stage at a predetermined pressure which is lower than the pressure in the preceding stage, flowing the withdrawn vaporized refrigerant from each stage out of direct contact but in heat exchange relationship with the liquid in the preceding stage and withdrawing the chilled liquid from the last stage.

10. A process for continuously dewaxing mineral oils comprising the steps of continuously flowing a mixture of a wax containing mineral oil and a volatile diluent under pressure through a sequence of evaporating stages, evaporating a portion of the diluent at each stage operated at a substantially uniform vapor pressure, passing the unvaporized portion of the mixture to the next stage while substantially preventing the evaporation of the diluent from the mixture between stages, and maintaining in each stage a lower pressure than in the preceding stage by withdrawing the vaporized diluent from each stage at a predetermined pressure.

11. A process for continuously dewaxing mineral oils comprising the steps of continuously flowing a mixture of a wax containing mineral oil and a volatile diluent under pressure through a sequence of evaporating stages, evaporating a portion of the diluent at each stage, passing the unvaporized portion of the mixture to the next stage, maintaining in each stage a lower pressure than in the preceding stage by withdrawing the vaporized diluent from each stage at a predetermined pressure, and passing said withdrawn vaporized diluent out of direct contact in heat exchange relationship with the liquid oil mixture in the preceding stage.

ALVIN PIERCE ANDERSON.
CHEVER M. KELLOGG.